Patented Apr. 17, 1928.

1,666,440

UNITED STATES PATENT OFFICE.

DIRK COSTER, OF HAARLEM, NETHERLANDS, AND GEORG von HEVESY, OF COPENHAGEN, DENMARK, ASSIGNORS TO N. V. PHILIPS' GLOEILAMPENFABRIEKEN, OF EINDHOVEN.

SEPARATION OF HAFNIUM AND ZIRCONIUM.

No Drawing. Application filed July 15, 1924, Serial No. 726,173, and in Denmark July 18, 1923.

This invention has for its object a process of separating the element having the atomic number 72, called hafnium, and zirconium, said process being essentially characterized by the use of a halogen compound for the separation of the hafnium and the zirconium, the difference in solubility of the oxyhalogenides of hafnium and zirconium and the difference in vapour pressure of the hafnium and zirconium tetranalogenides being taken advantage of.

In order to separate the hafnium from the zirconium the following method is followed:

The zirconium ore is converted into a soluble form, for example into the sulphate by sulphuric acid treatment, then a precipitate is formed by means of aqua ammonia and the hydroxide produced is dissolved in hydrochloric acid. On evaporating or cooling the latter solution, the hafnium oxychlorides are substantially precipitated, the zirconium oxychloride for the greater part and the impurities such as the iron chloride which is always present only to a very slight extent If the crystallization is repeated, the hafnium is continually concentrated in the crystals and at the same time they are purified to a continually higher extent from iron and similar impurities. This is also the case with the other oxyhalogenides and mixtures of same, and the present invention consequently also relates to the use of hydrohalogenic acids other than hydrochloric acid and if necessary of mixtures of hydrohalogenic acids.

The following example of resorting to recrystallization for the separation of hafnium and zirconium may be mentioned:

One part by weight of zirconium oxychloride containing hafnium is dissolved in the heated condition in three parts by weight of concentrated hydrochloric acid and three parts by weight of water, whereupon the solution is left to cool. Thus oxychlorides richer in hafnium than the solution are separated by crystallization. The oxychlorides precipitated are dissolved in hot hydrochloric acid, whereupon the solution is left to cool, so that again oxychlorides containing comparatively more hafnium than the oxychlorides originally precipitated are separated by crystallization.

By continuing this process, it is possible to obtain the desired extent of separation for hafnium and zirconium, and even pure hafnium and zirconium oxychloride.

Instead of separating the oxyhalogenides from the solution by cooling, they may also be separated from the aqueous or weakly acid solution by adding the corresponding concentrated hydrohalogenic acids, a corresponding soluble halogenide, for example calcium halogenide, or by adding alcohol or any other suitable precipitating medium. The substance precipitated is richer in hafnium than the solution and by continuing the process the desired extent of separation may be obtained for hafnium and zirconium.

As the solubility of the oxyhalogenides is minimal for a certain concentration of the hydrohalogenic acid, the precipitation may be produced by adding water to a solution of oxyhalogenides in the corresponding highly concentrated halogen acid.

Instead of submitting the oxyhalogenides to fractional crystallization or fractional precipitation, a mixture of the tetrahalogenides may be started from in order to separate hafnium and zirconium. The said tetrahalogenides are submitted to fractional sublimation, so that the residual (nonvolatilized) substance becomes comparatively richer in hafnium owing to the fact that the hafnium tetrahalogenides have a lower vapour pressure than the zirconium tetrahalogenides. If desired the tetrahalogenides may be easily converted into oxyhalogenides by dissolving in water in the corresponding hydrohalogenic acid, alcohol and the like, after which the solution may be further treated according to one of the described processes.

It has already been proposed in a copending application, Serial No. 699,145, to carry out the process in which the separation of hafnium and zirconium is effected by starting from a solution of the double fluorides of hafnium and zirconium and submitting the latter to fractional crystallization.

What we claim is:

1. The process of separating hafnium and zirconium, characterized by submitting halogen compounds of hafnium and zirconium to fractional separation.

2. The process of separating hafnium and zirconium, characterized by submitting halogenides of hafnium and zirconium to fractional separation.

3. The process of separating hafnium and zirconium, characterized by submitting oxyhalogenides of hafnium and zirconium to fractional separation.

4. The process of separating hafnium and zirconium, characterized in that zirconium oxychloride containing hafnium is dissolved in a heated condition in hydrochloric acid, whereupon the solution is left to cool, so that oxychlorides are separated which are comparatively richer in hafnium than the solution.

In testimony whereof we affix our signatures, at the city of The Hague, this 13th day of June 1924; at the city of Copenhagen, this 27th day of June 1924.

DIRK COSTER.
GEORG von HEVESY.